(12) United States Patent  (10) Patent No.: US 9,457,793 B2
Uno  (45) Date of Patent: Oct. 4, 2016

(54) VEHICLE INFORMATION PROCESSING SYSTEM

(75) Inventor: Satoshi Uno, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 25 days.

(21) Appl. No.: 13/976,752

(22) PCT Filed: Jan. 12, 2011

(86) PCT No.: PCT/JP2011/050368
§ 371 (c)(1),
(2), (4) Date: Jun. 27, 2013

(87) PCT Pub. No.: WO2012/095964
PCT Pub. Date: Jul. 19, 2012

(65) Prior Publication Data
US 2013/0274958 A1    Oct. 17, 2013

(51) Int. Cl.
*B60W 20/00* (2016.01)
*B60W 50/00* (2006.01)
(Continued)

(52) U.S. Cl.
CPC .......... *B60W 20/00* (2013.01); *B60L 15/2009* (2013.01); *B60L 15/2045* (2013.01); *B60W 10/06* (2013.01); *B60W 10/08* (2013.01); *B60W 30/143* (2013.01); *B60W 50/0097* (2013.01); *B60W 50/0098* (2013.01); *B60L 2240/622* (2013.01); *B60L 2250/26* (2013.01); *B60L 2260/26* (2013.01); *B60L 2260/50* (2013.01); *B60W 30/18127* (2013.01); *B60W 30/18154* (2013.01); *B60W 2050/0078* (2013.01); *B60W 2050/0089* (2013.01); *B60W 2540/30* (2013.01);
(Continued)

(58) Field of Classification Search
None
See application file for complete search history.

(56) References Cited

U.S. PATENT DOCUMENTS 3,872,283 A    3/1975 Smith et al.
5,521,823 A *  5/1996 Akita et al. .................... 701/36
(Continued)

FOREIGN PATENT DOCUMENTS

DE    201 14 418 U1    10/2001
DE    103 15 047 A1    10/2004
(Continued)

OTHER PUBLICATIONS

International Search Report Issued Apr. 12, 2011 in PCT/JP11/050368 Filed Jan. 12, 2011.
(Continued)

*Primary Examiner* — Fadey Jabr
*Assistant Examiner* — Kevin P Mahne
(74) *Attorney, Agent, or Firm* — Oblon, McClelland, Maier & Neustadt, L.L.P.

(57) ABSTRACT

There is provided a vehicle information processing system for assisting a driver in a specified assistance area. The vehicle information processing system includes an operation pattern setting part for setting an operation pattern in the assistance area on the basis of driving operation information of the driver when the driver enters the assistance area and an assistance information determining part for determining assistance information for assisting the driver in the assistance area on the basis of the operation pattern in the assistance area which is set by the operation pattern setting part. According to this structure, it is possible to assist the driver using high-accuracy assistance information corresponding to the operation pattern and thus perform assistance suitable for the driver with high accuracy.

11 Claims, 9 Drawing Sheets

(51) Int. Cl.
*B60W 40/09* (2012.01)
*B60W 30/14* (2006.01)
*B60W 10/06* (2006.01)
*B60W 10/08* (2006.01)
*B60L 15/20* (2006.01)
*B60W 30/18* (2012.01)

(52) U.S. Cl.
CPC .... *B60W 2550/143* (2013.01); *B60W 2550/22* (2013.01); *B60W 2550/402* (2013.01); *Y02T 10/645* (2013.01); *Y02T 10/72* (2013.01); *Y02T 10/7283* (2013.01); *Y02T 10/7291* (2013.01); *Y02T 10/84* (2013.01); *Y02T 90/16* (2013.01); *Y02T 90/162* (2013.01); *Y10S 903/93* (2013.01)

(56) References Cited

U.S. PATENT DOCUMENTS

| | | | |
|---|---|---|---|
| 5,661,650 | A | 8/1997 | Sekine et al. |
| 6,115,668 | A | 9/2000 | Kaneko et al. |
| 6,161,072 | A | 12/2000 | Clapper |
| 6,252,544 | B1 | 6/2001 | Hoffberg |
| 6,549,145 | B2 | 4/2003 | Hsu et al. |
| 6,549,841 | B1 | 4/2003 | AxElsson |
| 6,631,322 | B1 | 10/2003 | Arthur et al. |
| 6,847,892 | B2 | 1/2005 | Zhou et al. |
| 6,993,421 | B2 | 1/2006 | Pillar et al. |
| 7,849,944 | B2 | 12/2010 | DeVault |
| 8,019,501 | B2 | 9/2011 | Breed |
| 2006/0290202 | A1* | 12/2006 | Shibata et al. ............... 303/165 |
| 2007/0027583 | A1 | 2/2007 | Tamir et al. |
| 2007/0265759 | A1 | 11/2007 | Salinas et al. |
| 2009/0005929 | A1* | 1/2009 | Nakao et al. ............... 701/35 |
| 2009/0076698 | A1* | 3/2009 | Yokoyama et al. ........... 701/70 |
| 2009/0132139 | A1* | 5/2009 | Takeuchi et al. ............ 701/70 |
| 2009/0319176 | A1* | 12/2009 | Kudoh et al. ............... 701/207 |
| 2010/0004839 | A1* | 1/2010 | Yokoyama et al. ........... 701/70 |
| 2010/0063722 | A1 | 3/2010 | Yoshikawa |
| 2010/0112529 | A1 | 5/2010 | Miura |
| 2013/0204460 | A1 | 8/2013 | Uno |

FOREIGN PATENT DOCUMENTS

| | | |
|---|---|---|
| DE | 10 2008 019 174 A1 | 10/2009 |
| JP | 2004-108777 | 4/2004 |
| JP | 2005-297817 A | 10/2005 |
| JP | 2006-347531 | 12/2006 |
| JP | 2007-008203 A | 1/2007 |
| JP | 2007-196851 A | 8/2007 |
| JP | 2008-074337 A | 4/2008 |
| JP | 2009 31837 | 2/2009 |
| JP | 2009 53732 | 3/2009 |
| JP | 2009 244167 | 10/2009 |
| WO | WO 2010/081836 A1 | 7/2010 |
| WO | WO 2012/049767 A1 | 4/2012 |

OTHER PUBLICATIONS

Extended European Search Report issued Apr. 30, 2015 in Patent Application No. 11855881.6.
Office Action issued on Mar. 25, 2015 in U.S. Appl. No. 13/498,412.
U.S. Appl. No. 13/879,524, filed Apr. 15, 2013.
Office Action issued on Sep. 9, 2015 in U.S. Appl. No. 13/498,412.
Notice of Allowance issued on Feb. 17, 2016 in U.S. Appl. No. 13/498,412.

* cited by examiner

Fig.6
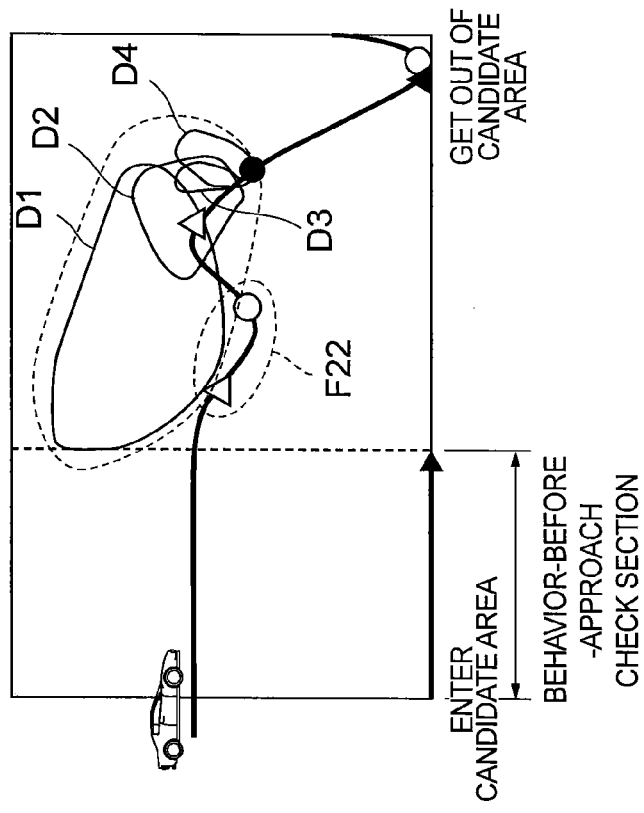
(a)
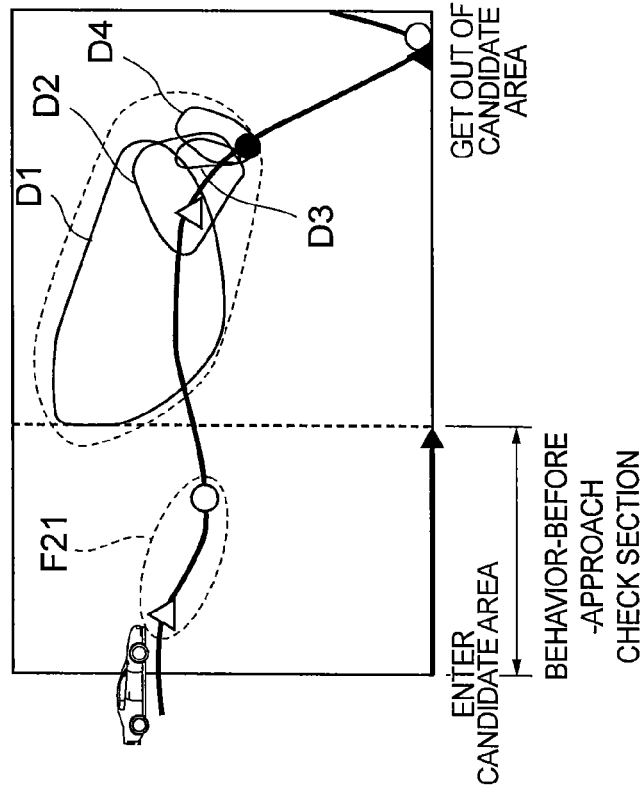
(b)

VEHICLE INFORMATION PROCESSING SYSTEM

TECHNICAL FIELD

The present invention relates to a vehicle information processing system for assisting the driver of a vehicle.

BACKGROUND ART

Various techniques for assisting the driver of a vehicle have been developed. For example, Patent Literature 1 discloses a driving assistance device which specifies the stop position of the vehicle in advance on the basis of map information or traffic information, specifies a coasting start position for coasting to the stop position on the basis of the specified stop position and the coasting distance, and notifies the driver of, for example, the coasting start position (the accelerator is turned off) or the braking start position (the brake is turned on), thereby making the driver to drive the vehicle with low energy consumption.

CITATION LIST

Patent Literature

[Patent Literature 1] Japanese Unexamined Patent Application Publication No. 2009-244167
[Patent Literature 2] Japanese Unexamined Patent Application Publication No. 2009-53732

SUMMARY OF INVENTION

Technical Problem

In the driving assistance device disclosed in Patent Literature 1, the stop position is uniformly specified on the basis of the map information or the traffic information and assistance is uniformly performed on the basis of the uniformly specified stop position. However, the stop position varies depending on the vehicle (further, the driver of the vehicle) and the time when the accelerator is turned off and the brake is turned on varies depending on the driver in the operation when the vehicle is decelerated and stopped. Therefore, when assistance is uniformly performed regardless of the vehicle (driver), the driver feels the assistance operation is too complicated.

An object of the invention is to provide a vehicle information processing system capable of performing high-accuracy assistance suitable for the driver.

Solution to Problem

According to an aspect of the invention, there is provided a vehicle information processing system for assisting a driver in a specified assistance area. The vehicle information processing system includes operation pattern setting means for setting an operation pattern in the assistance area on the basis of driving operation information of the driver when the driver enters the assistance area and assistance information determining means for determining assistance information for assisting the driver in the assistance area on the basis of the operation pattern in the assistance area which is set by the operation pattern setting means.

For example, since the shape of the road varies depending on the assistance area, the operation pattern of the driver is also changed. Even in the same assistance area, the operation pattern varies depending on the driver since individual drivers have different driving habits. In addition, in the same assistance area, when surroundings are changed (due to disturbance), the operation pattern of the driver varies depending on the surroundings. Therefore, the operation pattern of the driver in the assistance area is recognized and assistance corresponding to the recognized operation pattern is performed, which makes it possible to perform high-accuracy assistance suitable for the driver.

In the vehicle information processing system, the operation pattern setting means sets the operation pattern of the driver in the assistance area on the basis of the driving operation information (for example, accelerator operation information and brake operation information) of the driver when the driver enters the assistance area. In the vehicle information processing system, the assistance information determining means determines the assistance information for assisting the driver on the basis of the operation pattern and assists the driver on the basis of the assistance information. As such, in the vehicle information processing system, when the vehicle enters the assistance area, the operation pattern of the driver is set and the assistance information is determined on the basis of the operation pattern. Therefore, it is possible to assist the driver using high-accuracy assistance information corresponding to the operation pattern and thus perform assistance suitable for the driver with high accuracy. Since the assistance suitable for the driver is performed, the driver can receive assistance without feeling the process is too complicated or the discomfort from the assistance.

In the vehicle information processing system according to the above-mentioned aspect of the invention, the operation pattern in the assistance area may be provided according to an operation factor, and the operation pattern setting means may set the operation pattern in the assistance area on the basis of the driving operation information of the driver from the time when the driver enters the assistance area to a behavior-before-stop start position.

In the vehicle information processing system, the operation patterns for each assistance area are prepared according to the operation factor (for example, the habit of the driving operation of the driver and disturbance (avoidance of a stopped vehicle and interruption)). Then, in the vehicle information processing system, the operation pattern setting means sets the operation pattern among the prepared operation patterns, on the basis of the driving operation information of the driver from the time when the driver enters the assistance area to the behavior-before-stop start position (for example, a deceleration start position when the accelerator is turned off, a brake start position when the brake is turned on, and a stop position when the brake is turned off). As such, in the vehicle information processing system, since the operation pattern is prepared according to the operation factor, it is possible to simply and accurately set the operation pattern on the basis of the driving operation information of the driver and determine high-accuracy assistance information on the basis of the accurately set operation pattern.

In the vehicle information processing system according to the above-mentioned aspect of the invention, when the operation pattern in the assistance area which is set by the operation pattern setting means is changed, the assistance information determining means may change the assistance information depending on the changed operation pattern.

When the operation pattern of the driver in the assistance area is changed, the time the driver performs a brake operation or an accelerator operation is changed and the assistance information needs to be changed. In the vehicle information processing system, when the operation pattern setting means changes the operation pattern in the assistance area, the assistance information determining means changes the assistance information depending on the changed operation pattern. As such, in the vehicle information processing system, since the assistance information is changed depending on the changed operation pattern, it is possible to change the assistance information to high-accuracy assistance information and thus assist the driver with high accuracy.

In the vehicle information processing system according to the above-mentioned aspect of the invention, reliability may be set to each operation pattern on the basis of the behavior-before-stop start position from the assistance area entrance position, and the assistance information determining means may determine the assistance information on the basis of the reliability of each operation pattern.

In the vehicle information processing system, the reliability is set to each operation pattern. The reliability is an index for determining the assistance information and is set on the basis of the behavior-before-stop start position (that is, the distance between an assistance area entrance position and the behavior-before-stop start position of each operation pattern) from the assistance area entrance position. It is considered that, in the basic operation pattern of deceleration and stop which is not affected by disturbance, the behavior-before-stop start position is close to the assistance area entrance position and a deceleration and stop behavior starts earliest. Therefore, in the vehicle information processing system, the assistance information determining means determines the assistance information on the basis of the reliability of the operation pattern. As such, in the vehicle information processing system, since the reliability is set to each operation pattern on the basis of the behavior-before-stop start position from the assistance area entrance position, it is possible to simply and accurately determine the assistance information on the basis of the reliability.

In the vehicle information processing system according to the above-mentioned aspect of the invention, higher reliability may be set to the operation pattern in which the behavior-before-stop start position in the assistance area is closer to the assistance area entrance position.

As described above, in the operation pattern which is not affected by disturbance, the behavior-before-stop start position is close to the assistance area entrance position. When there is no influence of disturbance, the driver generally performs the driving operation in this operation pattern. On the other hand, when there is an influence of disturbance, the behavior-before-stop start position is away from the assistance area entrance point. Therefore, in the vehicle information processing system, higher reliability is set to the operation pattern in which the behavior-before-stop start position is closer to the assistance area entrance position. As such, in the vehicle information processing system, since higher reliability is set to the operation pattern in which the behavior-before-stop start position is closer to the assistance area entrance position, it is possible to accurately set reliability to each traveling pattern.

In the vehicle information processing system according to the above-mentioned aspect of the invention, the reliability may be set on the basis of the number of times the driver performs the same operation pattern in the assistance area.

The operation pattern which is more frequently performed in each assistance area by the driver is more likely to be performed in the assistance area by the driver. Therefore, in the vehicle information processing system, the reliability is set on the basis of the number of times the driver performs each operation pattern in the assistance area. As such, in the vehicle information processing system, since the reliability is set to each operation pattern on the basis of the number of times the driver performs the operation pattern, it is possible to accurately set reliability to each traveling pattern.

In the vehicle information processing system according to the above-mentioned aspect of the invention, the reliability set to the operation pattern with high frequency of execution may be higher than the reliability set to the operation pattern with low frequency of execution.

As described above, the operation pattern which is more frequently performed by the driver is more likely to be performed in the assistance area by the driver. Therefore, in the vehicle information processing system, the reliability set to the operation pattern with high frequency of execution is higher than the reliability set to the operation pattern with low frequency of execution. As such, in the vehicle information processing system, since the reliability set to the operation pattern with high frequency of execution is higher than the reliability set to the operation pattern with low frequency of execution, it is possible to accurately set reliability to each traveling pattern.

According to another aspect of the invention, there is provided a vehicle information processing system for assisting a driver in a specified assistance area. The vehicle information processing system includes a database that stores an operation pattern and assistance information for assisting the driver corresponding to the operation pattern so as to be associated with each other for each assistance area.

The vehicle information processing system includes the database which stores the operation pattern and the assistance information corresponding to the operation pattern so as to be associated with each other for each assistance area. Therefore, the use of the database makes it possible to set the operation pattern of the driver in the assistance area on the basis of the driving operation information of the driver for each assistance area when the driver enters the assistance area and thus determine the assistance information associated with the set operation pattern. As a result, the vehicle information processing system has the same effect as the vehicle information processing system according to the above-mentioned aspect of the invention.

In the vehicle information processing system according to the above-mentioned aspect of the invention, reliability may be set to each operation pattern stored in the database. As such, since the reliability is set to each operation pattern stored in the database, the vehicle information processing system has the same effect as the vehicle information processing system according to the above-mentioned aspect of the invention using the reliability set to each operation pattern.

In the vehicle information processing system according to the above-mentioned aspect of the invention, the driving operation information of the driver and vehicle position information may be stored so as to be associated with each other. The stopping of the vehicle may be determined on the basis of the stored information. The assistance area may be specified on the basis of the frequency of stop in the same area.

In the vehicle information processing system, the driving operation information of the driver and the vehicle position information are stored so as to be associated with each other. In the vehicle information processing system, it is determined whether the vehicle is stopped in each area by the driving operation of the driver, on the basis of the stored information and the assistance area is specified on the basis of the frequency of stop in the same area. Since the driver of each vehicle constantly decelerates and stops, or starts and accelerates the vehicle in the area with high frequency of stops, it is possible to assist the driver at the usual deceleration and stop position or the usual start and acceleration position of the vehicle. For example, when the vehicle is decelerated and stopped, the usual deceleration start position (when the accelerator is turned off), brake start position (when the brake is turned on), and stop position (the brake is turned off) of each vehicle are determined from the driving operation information and the vehicle position information in the area. Therefore, it becomes possible to assist the driver with the usual driving operation sense during the operation of the vehicle. As such, in the vehicle information processing system, the driving behavior of the driver is learned to specify the assistance area, on the basis of information including the driving operation information of the driver and the vehicle position information. Therefore, it is possible to perform assistance suitable for the driver.

Advantageous Effects of Invention

According to the invention, when the driver enters the assistance area, the operation pattern of the driver is set and assistance information is determined on the basis of the operation pattern. Therefore, it is possible to assist the driver using high-accuracy assistance information corresponding to the operation pattern and thus perform assistance suitable for the driver with high accuracy.

BRIEF DESCRIPTION OF DRAWINGS

FIG. 6 is a diagram illustrating examples of a deceleration start position distribution in each traveling pattern and a behavior-before-approach distribution in a fluttering accelerator pattern in this embodiment: FIG. 6(a) shows a case in which the behavior-before-approach distribution of the fluttering accelerator pattern is included in a behavior-before-approach check section; and FIG. 6(b) shows a case in which the behavior-before-approach distribution of the fluttering accelerator pattern is arranged after the behavior-before-approach check section.

DESCRIPTION OF EMBODIMENTS

Figure 1:
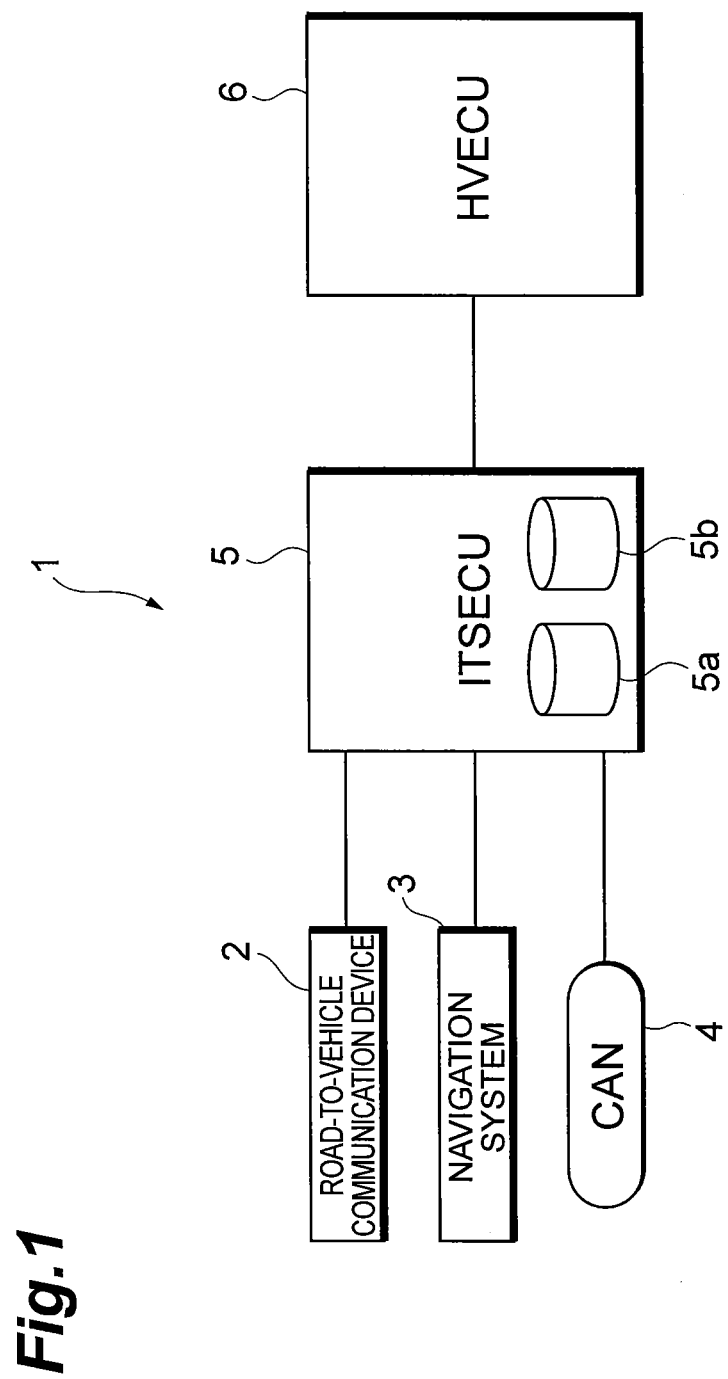
FIG. 1 is a diagram illustrating the structure of a vehicle information processing system according to an embodiment.

Hereinafter, a vehicle information processing system according to an embodiment of the invention will be described with reference to the accompanying drawings. In the drawings, the same or equivalent components are denoted by the same reference numerals and the description thereof will not be repeated.

In this embodiment, the invention is applied to a vehicle information processing system which is provided in a hybrid vehicle with an eco assistance function. In the vehicle information processing system according to this embodiment, a function for achieving eco assistance (assist the driver of the vehicle in reducing fuel consumption) suitable for the driver of each vehicle when the vehicle is decelerated and stopped is provided as one of the functions of an ITS [Intelligent Transport Systems]. In this embodiment, the function will be described in detail. It is assumed that deceleration means using the foot brake to reduce the speed. It is determined that fuel efficiency needs to be improved on the basis of the foot brake operation.

A technique which cooperates with infrastructure is considered as an eco assistance technique. For example, an eco assistance target area is an intersection where infrastructure facilities (for example, a beacon) are installed. However, the infrastructure facilities cannot be installed at all of the intersections where the vehicle is likely to stop. Therefore, in the eco assistance technique which cooperates with infrastructure, eco assistance cannot be performed for all positions where the vehicle is stopped. In the vehicle information processing system according to this embodiment, candidate areas of an assistance area are set by learning and the assistance area (the area in which the reproducibility of the behavior of the vehicle being decelerated and stopped on the ordinary traveling route is high) in which the vehicle is constantly decelerated and stopped is specified from the candidate areas by learning. Then, the unique deceleration behavior of the vehicle in the assistance area is extracted and eco assistance is performed using the assistance area and the deceleration behavior (deceleration prediction information).

Figure 2:
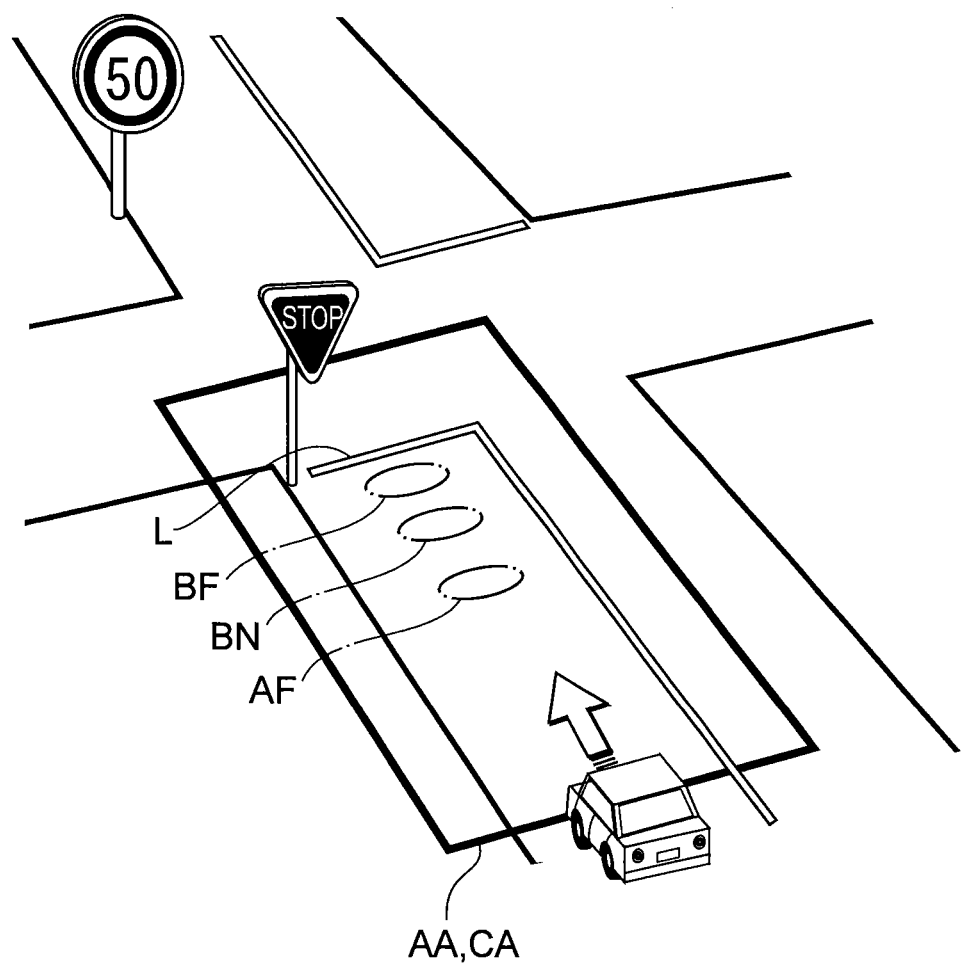
FIG. 2 is a diagram illustrating an example of a candidate area (assistance area) according to this embodiment.
Figure 3:
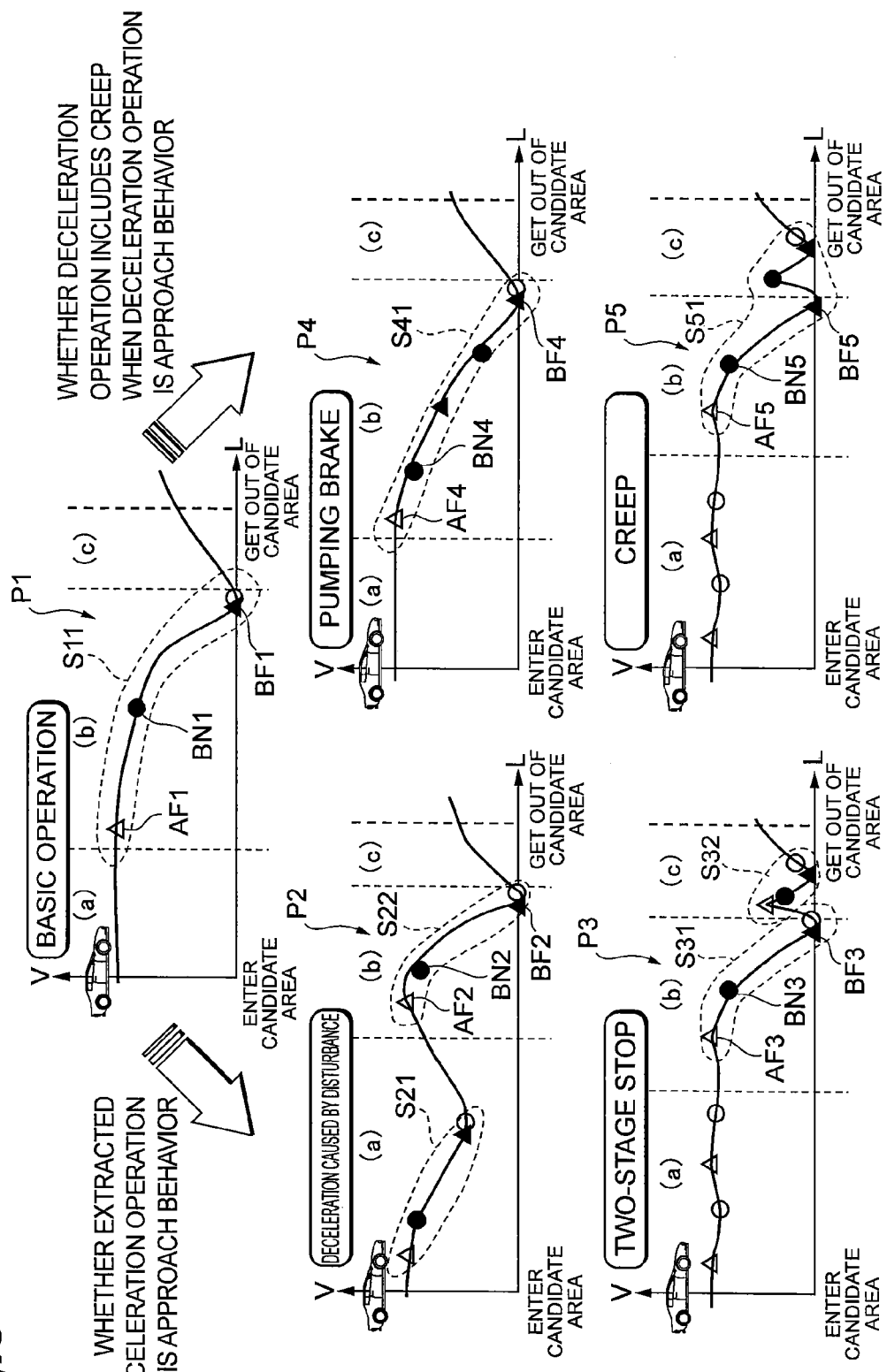
FIG. 3 is a diagram illustrating a deceleration pattern according to this embodiment.
Figure 4:
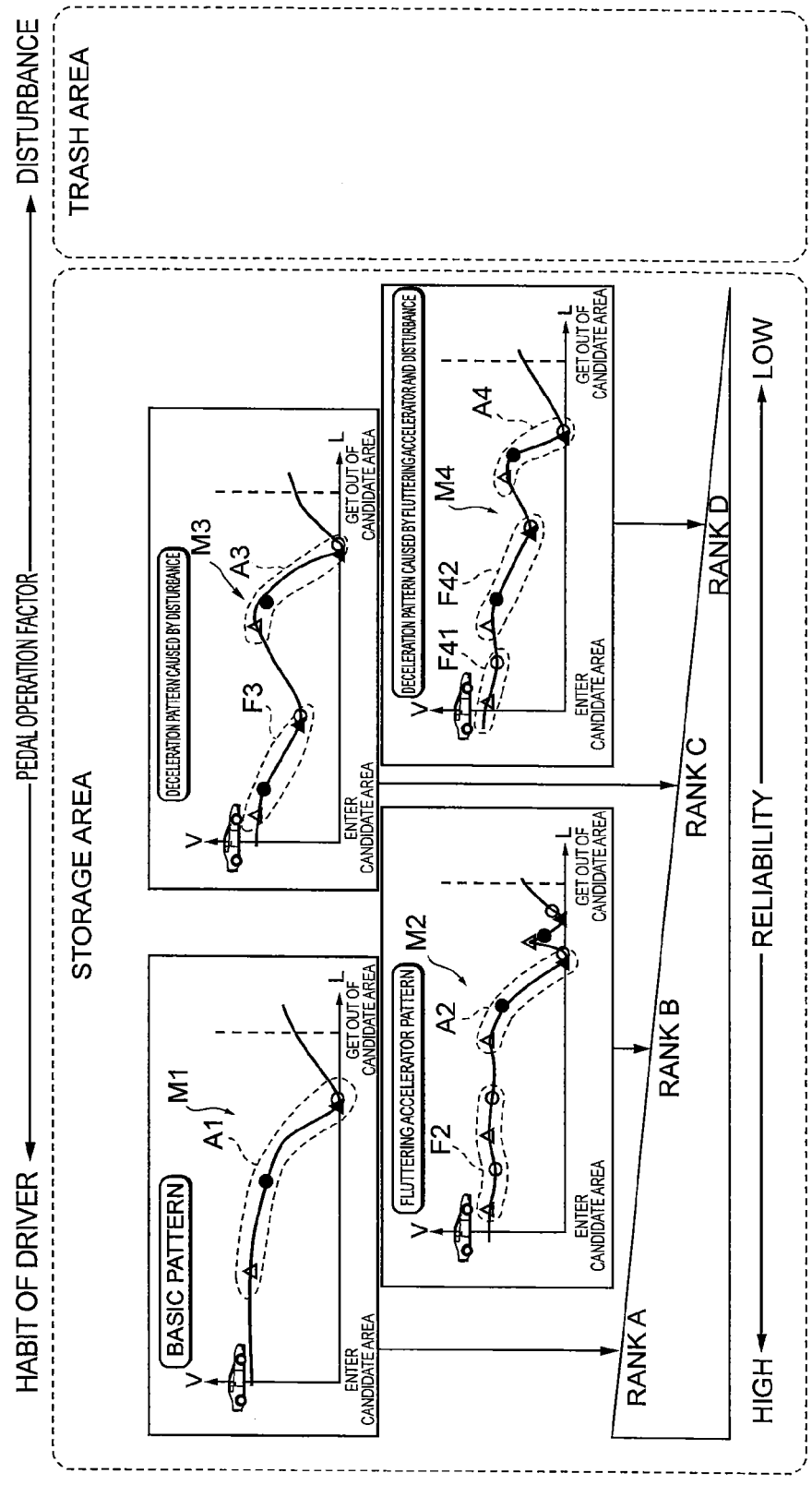
FIG. 4 is a diagram illustrating a traveling pattern according to this embodiment.
Figure 5:
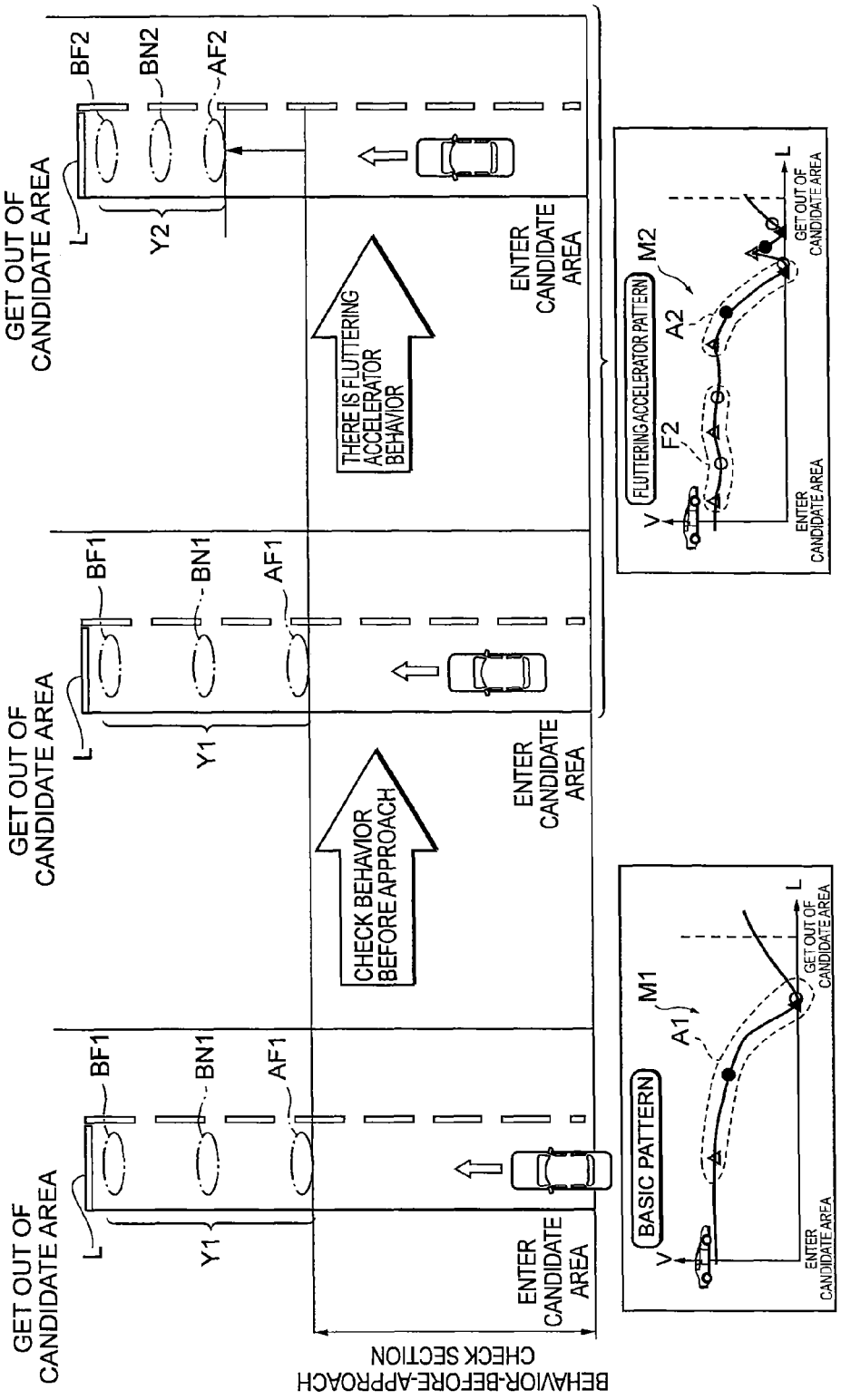
FIG. 5 is a diagram illustrating deceleration prediction according to this embodiment.

A vehicle information processing system 1 according to this embodiment will be described with reference to FIGS. 1 to 6. FIG. 1 is a diagram illustrating the structure of the vehicle information processing system according to this embodiment. FIG. 2 shows an example of the candidate area (assistance area) according to this embodiment. FIG. 3 is a diagram illustrating a deceleration pattern according to this embodiment. FIG. 4 is a diagram illustrating a traveling pattern according to this embodiment. FIG. 5 is a diagram illustrating deceleration prediction according to this embodiment. FIG. 6 shows examples of a deceleration start position distribution in each traveling pattern and a behavior-before-approach distribution in a fluttering accelerator pattern in this embodiment.

The vehicle information processing system 1 performs eco assistance using candidate area learning for setting assistance candidate areas, deceleration behavior learning for learning a deceleration behavior in each candidate area and extracting deceleration prediction information, deceleration prediction for outputting the deceleration prediction information (look-ahead information) of each assistance area, and the deceleration prediction information. In order to perform the eco assistance, the vehicle information processing system 1 includes a road-to-vehicle communication device 2, a navigation system 3, a CAN [Controller Area Network] 4, an ITSECU [Electronic Control Unit] 5, and an HV [Hybrid vehicle] ECU 6.

In the candidate area learning or the deceleration behavior learning, the information of each vehicle is stored in a database. However, means for identifying the drivers may be provided and the information of each identified driver may be stored in the database. When the driver of the vehicle is specified, the information of the driver is stored in the database. For example, a method of specifying the driver on the basis of the behavior or the traveling route of the vehicle is used as the method of specifying the driver.

The road-to-vehicle communication device 2 performs road-to-vehicle communication with, for example, a beacon of the infrastructure. When the vehicle enters a communication area of the infrastructure, the road-to-vehicle communication device 2 receives information from the infrastructure and transmits the received information to the ITSECU 5. Examples of the information required by the ITSECU 5 among the information items received from the infrastructure include information about the alignment of the road to a service target intersection, information about the intersection (for example, information about the shape or position of the intersection and information about a stop line), and signal cycle information.

The navigation system 3 detects the current position of the vehicle and performs route guidance to the destination. In particular, when the navigation system 3 detects the current position of the vehicle at a predetermined time interval on the basis of signals received by a GPS [Global Positioning System] device, it transmits information about the current position to the ITSECU 5 or the HVECU 6. In addition, the navigation system 3 transmits map information required by the ITSECU 5 among data stored in a map database to the ITSECU 5. Examples of the information required by the ITSECU 5 include information about vehicle stop positions which are provided by law, such as position information about a temporary stop position, a crossing, and a traffic signal. The vehicle without the navigation system may include a GPS device in order to acquire the current position of the vehicle.

The CAN 4 is a LAN in the vehicle and is used to transmit and receive information in the vehicle. Examples of the information required by the ITSECU 5 among the information items flowing through the CAN 4 include accelerator operation information, brake operation information, vehicle speed information, and acceleration and deceleration information. The ITSECU 5 includes a communication interface of the CAN 4.

The ITSECU 5 is an electronic control unit including, for example, a CPU [Central Processing Unit], a ROM [Read Only Memory], and a RAM [Random Access Memory] and implements various functions of a advanced road traffic system. Here, among the functions of the ITSECU 5, only a function for achieving eco assistance suitable for the driver of each vehicle when the vehicle is decelerated and stopped (in particular, candidate area learning, deceleration behavior learning, and deceleration prediction) will be described. In this embodiment, the processes of the ITSECU 5 correspond to operation pattern setting means and assistance information determining means in the claim and a database 5b corresponds to a database in the claim.

Next, the candidate area learning will be described. In the candidate area learning, a section in which the deceleration operation is frequently performed is extracted as the candidate area in the traveling route of the vehicle (furthermore, the driver of the vehicle). There are two learning methods. One learning method extracts the candidate area on the basis of the position where the vehicle is predicted to be decelerated and stopped in the traveling route of the vehicle (for example, a temporary stop position, a traffic signal (red signal), and a crossing which are provided by law). The other learning method stores driver's pedal operation information and vehicle position information when the driver drives the vehicle so as to be associated with each other and extracts the section in which the driver of the vehicle frequently performs the deceleration operation in practice as the candidate area on the basis of the stored information.

The detailed process of the first method will be described. While the vehicle is traveling, the ITSECU 5 receives map information (in particular, information about the position where the vehicle is predicted to be stopped, such as a temporary stop position, a crossing, or a traffic signal) about the road on which the vehicle travels from the navigation system 3 (map database). The ITSECU 5 determines whether the vehicle has passed through the position where the vehicle is predicted to stop (at the position, the deceleration operation is predicted to be frequently performed in the section before the position) whenever the current position information is received from the navigation system 3. When the vehicle has passed through the position where the vehicle is predicted to stop, the ITSECU 5 sets the candidate area on the basis of the information about the position. The position where the vehicle is predicted to stop may include the position which is registered as a destination or a point, such as home or a company, by the navigation system 3.

The detailed process of the second method will be described. While the vehicle is traveling, the ITSECU 5 stores the accelerator operation information and the brake operation information from the CAN 4 and the current position information from the navigation system 3 in the database 5a so as to be associated with each other at a predetermined time interval or a predetermined travel distance interval. When data is stored in the database 5a, the ITSECU 5 extracts the deceleration operation on the basis of the accelerator operation information and the brake operation information stored in the database 5a. The deceleration operation is performed in the order of the turning-off of the accelerator, the turning-on/off of the brake (repeatable), and the turning-on of the accelerator. Then, the ITSECU 5 counts the number of times the vehicle passes through the same route. At the same time, when the deceleration operation is extracted in the same section, the ITSECU 5 counts the number of deceleration operations and divides the number of deceleration operations by the number of passages to calculate a deceleration operation rate. In addition, the ITSECU 5 sets, as the candidate area, the section in which the number of passages is equal to or greater than a predetermined value (for example, 5 or 10 or more) and the deceleration operation rate is equal to or greater than a threshold value (for example, 80% or 90% or more). Other methods may be used to determine the section in which the deceleration operation is frequently performed.

When setting the candidate area, the ITSECU 5 sets, as the candidate area, an area which includes all lanes in the vehicle traveling direction in the width direction and has a predetermined distance in the length direction. The predetermined distance is set to be sufficiently long to include the driver's deceleration operation for stopping the vehicle. For example, as shown in FIG. 2, in the case of an intersection including a temporary stop line L, a section from the center of the intersection ahead of the temporary stop line L to a predetermined position (a position that is several hundreds of meters before the temporary stop line L) before the temporary stop line L is set as a candidate area CA. The length of the section is set to a value capable of sufficiently extracting the deceleration behavior when the vehicle is stopped. In addition, when the driver of each vehicle performs the deceleration operation, the distance traveled may be learned and used to set a range suitable for each vehicle (furthermore, each driver).

The deceleration behavior learning will be described. In the deceleration behavior learning, various kinds of information are stored whenever the vehicle passes through the candidate area, a valid deceleration operation (approach behavior) in the candidate area is extracted from the stored information, the candidate area in which the valid deceleration operation is extracted and the frequency of stop is high is specified as the assistance area, and deceleration prediction information in the assistance area is generated. When the deceleration prediction information in the assistance area is generated, in the deceleration behavior learning, a driving operation (behavior before approach) before the extracted approach behavior is extracted, the deceleration prediction information is generated for each traveling pattern corresponding to the behavior before approach, and reliability is set to each traveling pattern.

As shown in FIG. 2, the deceleration prediction information includes a deceleration start position (the position where the accelerator is turned off) AF, a brake start position (the position where the brake is turned on) BN, and a stop position (the position where the brake is turned off) BF in each assistance area AA. The deceleration prediction information is generated for each assistance area and is generated for each traveling pattern in each assistance area.

Before the detailed process of the deceleration behavior learning is described, the deceleration pattern used to extract the valid deceleration operation (filter detailed examination) will be described. The deceleration pattern is based on a pedal operation which is indispensable for the deceleration behavior, indicates a change in the pedal operation which can correspond to various driving behaviors, and is a deceleration behavior pattern involving a brake operation which is triggered by the operation of turning off the accelerator. The use of the various deceleration patterns makes it possible to recognize, for example, the habit of the driver of each vehicle or the influence of disturbance and specify the assistance area, when there is a deceleration approach to the ordinary deceleration target of the vehicle (furthermore, the driver of the vehicle).

FIG. 3 shows an example of the deceleration pattern. In FIG. 3, reference numeral P1 indicates the deceleration pattern of a basic operation, reference numeral P2 indicates a deceleration pattern in which deceleration occurs due to disturbance (for example, the avoidance of a stopped vehicle or interruption) before the vehicle is decelerated to a deceleration target, reference numeral P3 indicates a deceleration pattern in which the vehicle is stopped in two stages, reference numeral P4 indicates a deceleration pattern using a pumping brake, and reference numeral P5 indicates a deceleration pattern when there is a creep operation. The creep operation means that, after the vehicle is stopped, the driver repeats the operation of turning on and off the brake to gradually change the stop position. In FIG. 3, the horizontal axis is a vehicle position (distance traveled) L and the vertical axis is a vehicle speed V. In FIG. 3, a white triangle indicates an operation of turning off the accelerator, a white circle indicates an operation of turning on the accelerator, a black triangle indicates an operation of turning off the brake, and a black circle indicates an operation of turning on the brake. In FIG. 3, (b) indicates a section in which an approach behavior to the deceleration target is performed, (a) indicates a section in which a behavior before approach is performed, and (c) indicates a section in which a behavior after approach is performed. The deceleration behavior in the approach behavior section (b) is the deceleration and stop behavior of the vehicle (driver) with respect to the deceleration target.

The traveling pattern corresponding to the behavior before approach will be described. The traveling pattern indicates a change in the pedal operation capable of responding to various driving behaviors in the assistance area including the deceleration and stop behavior (approach behavior) with respect to the deceleration target in the approach behavior section (corresponding to an operation pattern in the claim). The traveling pattern is set on the basis of the behavior before approach, considering the habit of the driving operation of the driver or the influence of disturbance (pedal operation factors of the driver). The use of the various traveling patterns makes it possible to check whether the approach behavior occurs due to the habit of the driving operation of the driver or the influence of disturbance and thus provide accurate deceleration prediction information. Reliability is set to each traveling pattern.

FIG. 4 shows an example of the traveling pattern. In FIG. 4, reference numeral M1 indicates a basic traveling pattern, the traveling pattern represented by reference numeral M2 is a fluttering accelerator pattern, the traveling pattern represented by reference numeral M3 is a deceleration pattern caused by disturbance, and the traveling pattern represented by reference numeral M4 is a deceleration pattern caused by a fluttering accelerator and disturbance. In the basic pattern M1, there is no behavior before an approach behavior A1. In the fluttering accelerator pattern M2, a behavior F2 before approach which turns on and off the accelerator is performed before an approach behavior A2. In the example shown in FIG. 4, there is a deceleration operation including a 2-stage stop after the approach behavior A2. In the deceleration pattern M3 caused by disturbance, a behavior F3 before approach which decelerates the vehicle due to disturbance is performed before the approach behavior A3. In the deceleration pattern M4 caused by a fluttering accelerator and disturbance, a behavior F41 before approach which turns on and off the accelerator and a behavior F42 before approach which decelerates the vehicle due to disturbance are performed before an approach behavior A4. The four traveling patterns are used as data for generating the deceleration prediction information about each traveling pattern and are needed as learning data. The data is stored.

For a traveling pattern which does not include the deceleration and stop behavior (approach behavior) with respect to the deceleration target in the approach behavior section, since the traveling pattern is not data for generating the deceleration prediction information, it is not needed as learning data and the data is destroyed. This pattern is data in a 'trash area' shown in FIG. 4 and is mainly a traveling pattern which does not include the deceleration and stop behavior with respect to the deceleration target due to the influence of disturbance.

Next, reliability set to the traveling pattern will be described. The reliability is an index for determining the traveling pattern which is used as a base to generate the deceleration prediction information which is output when the vehicle enters the assistance area. In this embodiment, since there are four traveling patterns, four ranks, that is, rank A, rank B, rank C, and rank D are prepared in descending order of reliability and rank A is the basic traveling pattern.

In the deceleration prediction which will be described below, as shown in FIG. 5, when the vehicle enters the assistance area, the deceleration prediction information of the traveling pattern of rank A is output and the behavior before approach is checked on the basis of a pedal operation in a behavior-before-approach check section (a section from an assistance area entrance point to the deceleration start position of the traveling pattern of rank A) to recognize the traveling pattern. When a traveling pattern other than the traveling pattern of rank A is recognized, the deceleration prediction information is changed to the deceleration prediction information of the recognized traveling pattern and the changed deceleration prediction information is output.

The reliability is set in two steps. In the first step, the deceleration start positions of the approach behaviors in each traveling pattern are compared with each other and ranks are given to the four traveling patterns such that the highest rank is given to the traveling pattern in which deceleration approach starts earliest from the entrance of the vehicle to the area. FIG. 6 shows an example of the deceleration start position distribution of each traveling pattern in a given assistance area. In FIG. 6, reference numeral D1 indicates a deceleration start position distribution in the basic pattern, reference numeral D2 indicates a deceleration start position distribution in the fluttering accelerator pattern, reference numeral D3 indicates a deceleration start position distribution in the deceleration pattern caused by disturbance, and reference numeral D4 indicates a deceleration start position distribution in the deceleration pattern caused by a fluttering accelerator and disturbance. In the case of the assistance area, rank A is set to the basic pattern, rank B is set to the fluttering accelerator pattern, rank C is set to the deceleration pattern caused by disturbance, and rank D is set to the deceleration pattern caused by a fluttering accelerator and disturbance. The verification result of various areas proves that the deceleration behavior starts earliest in the basic pattern.

As such, when the reliability is set on the basis of only the deceleration start position, the following problems arise. The problems will be described with reference to the example shown in FIG. 6. In this example, as described above, the basic pattern is rank A and the fluttering accelerator pattern is rank B. Therefore, at the time the vehicle enters the assistance area, the deceleration prediction information of the basic pattern is output. Then, as shown in FIG. 6(*a*), when the behavior F21 of the fluttering accelerator before approach can be detected in the behavior-before-approach check section, it is possible to output the deceleration prediction information of the fluttering accelerator pattern. However, as shown in FIG. 6 (*b*), when the behavior F22 of the fluttering accelerator before approach is delayed and cannot be detected in the behavior-before-approach check section, the deceleration prediction information of the fluttering accelerator pattern cannot be output, regardless of the fluttering accelerator pattern. In this case, the accuracy of the deceleration prediction information is reduced.

In the second step, rank A and rank B are compared with each other to solve the above-mentioned problems. In the second step, the deceleration start position distribution of rank A is compared with the behavior-before-approach distribution of rank B. When the deceleration start position distribution of rank A is closer to the stop position than the behavior-before-approach distribution of rank B, the ranks are maintained. When the behavior-before-approach distribution of rank B is closer to the stop position than the deceleration start position distribution of rank A, the ranks are changed depending on the ratio of the frequency of execution of the traveling pattern to the frequency of execution of the basic pattern. The detailed change process will be described below.

Next, the detailed process will be described. When the candidate area is set by the candidate area learning, the ITSECU 5 determines whether the vehicle enters the candidate area whenever the current position information is received from the navigation system 3 while the vehicle is traveling. When it is determined that the vehicle enters the candidate area, the ITSECU 5 stores the accelerator operation information, brake operation information, and vehicle state information (for example, vehicle speed information and acceleration and deceleration information) from the CAN 4 and the current position information from the navigation system 3 in the database 5*b* so as to be associated with each other, at a predetermined time interval or a predetermined travel distance interval. Then, the ITSECU 5 determines whether the vehicle gets out of the candidate area whenever the current position information is received from the navigation system 3 while the vehicle is traveling. When it is determined that the vehicle gets out of the candidate area, the ITSECU 5 ends the storage of the information in the database 5*b* and increases the number of passages through the candidate area by 1. As data stored in the database 5*b*, only information obtained when the turning on/off of the accelerator pedal and the brake pedal is detected may be stored in the database 5*b*.

When the vehicle gets out of the candidate area, the ITSECU 5 sorts the deceleration operation and the acceleration operation and extracts the deceleration operation, on the basis of the currently stored data for the candidate area. As described above, the deceleration operation is performed in the order of the turning-off of the accelerator, the turning-on/off of the brake (repeatable), and the turning-on of the accelerator. The acceleration operation is performed in the order of the turning-off of the accelerator and the turning-on of the accelerator (repeatable).

When the deceleration operation is extracted, the ITSECU 5 determines the corresponding deceleration pattern from the prepared deceleration patterns on the basis of the extracted deceleration operation, determines whether the deceleration operation in the candidate area is an approach behavior to the deceleration target or a behavior before and after approach, and extracts only the approach behavior among the deceleration operations in the candidate area. As such, the ITSECU 5 determines whether the vehicle is decelerated and stopped, on the basis of the approach behavior (deceleration operation) in the candidate area. When the above-mentioned behavior is not performed, the number of stop operations is not counted and the subsequent process is stopped.

The process of determining whether the deceleration operation is the approach behavior or the behavior before and after approach is based on a vehicle speed when the accelerator is turned off (a vehicle speed when deceleration starts) and a vehicle speed when the brake is turned off (a vehicle speed when deceleration ends) in the deceleration operation. As can be seen from the example shown in FIG. 3, the deceleration operation during approach is deceleration from a high speed to a low speed (particularly, stop), the deceleration operation before approach is deceleration from a high speed to a high speed, and the deceleration operation after approach is deceleration from a low speed to a low speed. Therefore, the deceleration operation from a high speed to a low speed (stop) is extracted as the approach behavior to the deceleration target.

In the example shown in FIG. 3, in the deceleration pattern P1 of the basic operation, a deceleration operation S11 is the approach behavior. The deceleration operation S11 is extracted. In the deceleration pattern P2 in which deceleration due to disturbance occurs, a deceleration operation S21 is the behavior before approach and a deceleration operation S22 is the approach behavior. The deceleration operation S22 is extracted. In the deceleration pattern P3 in which the vehicle is stopped in two stages, a deceleration operation S31 is the approach behavior and a deceleration operation S32 is the behavior after approach. The deceleration operation S31 is extracted. In the deceleration pattern P4 using the pumping brake, a deceleration operation S41 is the approach behavior. The deceleration operation S41 is extracted. In the deceleration pattern P5 including the creep operation, a deceleration operation S51 is the approach behavior. However, in this case, since the creep operation after stop is also extracted, it is necessary to appropriately remove a creep portion.

When the approach behavior is extracted, the ITSECU 5 determines whether there is a creep operation in the approach behavior. This determination is based on the vehicle speed when the brake is turned off in the operation during approach. It is determined that there is a creep operation when a plurality of operations of turning off the brakes are continuously performed at a low vehicle speed. When there is a creep operation, the driver repeatedly turns on and off the brake to change the stop position after the vehicle is stopped and the brake is turned off. Therefore, it is determined whether there is a creep operation in order to accurately determine the stop position of the vehicle.

The ITSECU 5 sorts the behaviors before approach for the traveling pattern from which the approach behavior can be extracted to recognize any one of the four traveling patterns. First, the ITSECU 5 determines whether there is a behavior before approach on the basis of the driving operation information of the area. When there is no behavior before approach, the ITSECU 5 determines the traveling pattern is the basic pattern. When the traveling pattern is not the basic pattern, the ITSECU 5 determines that the operation is any one of the fluttering accelerator operation, the deceleration operation caused by disturbance, and the deceleration operation caused by a fluttering accelerator operation and disturbance on the basis of the driving operation information before the approach behavior in the area, and determines the traveling pattern from the fluttering accelerator pattern, the deceleration pattern caused by disturbance, and the deceleration pattern caused by a fluttering accelerator and disturbance, on the basis of the determined operation. When the traveling pattern is recognized in the check section before approach in the deceleration prediction which will be described below, the recognition result is used.

When the traveling pattern is recognized, the ITSECU 5 specifies the deceleration start position from the position information when the accelerator is turned off, specifies the brake start position from the position information when the brake is turned on, and specifies the stop position from the position information when the brake is turned off, on the basis of the deceleration operation in the approach behavior. For the operation of turning on the brake, when the turning on/off of the brake is repeated, the operation of turning on the brake immediately after the operation of turning off the accelerator is extracted. For the operation of turning off the brake, when the turning on/off of the brake is repeated, the last operation of turning off the brake is extracted. However, when there is a creep operation, the first operation of turning off the brake to start the creep operation is extracted.

In the example shown in FIG. 3, in the deceleration operation S11 during approach, the position where an operation AF1 of turning off the accelerator is performed is the deceleration start position, the position where an operation BN1 of turning on the brake is performed is the brake start position, and the position where an operation BF1 of turning off the brake is performed is the stop position. In the deceleration operation S22 during approach, the position where an operation AF2 of turning off the accelerator is performed is the deceleration start position, the position where an operation BN2 of turning on the brake is performed is the brake start position, and the position where an operation BF2 of turning off the brake is performed is the stop position. In the deceleration operation S31 during approach, the position where an operation AF3 of turning off the accelerator is performed is the deceleration start position, the position where an operation BN3 of turning on the brake is performed is the brake start position, and the position where an operation BF3 of turning off the brake is performed is the stop position. In the deceleration operation S41 during approach, the position where an operation AF4 of turning off the accelerator is performed is the deceleration start position, the position where an operation BN4 of turning on the brake is performed is the brake start position, and the position where an operation BF4 of turning off the brake is performed is the stop position. In the deceleration operation S51 during approach, the position where an operation AF5 of turning off the accelerator is performed is the deceleration start position, the position where an operation BN5 of turning on the brake is performed is the brake start position, and the position where an operation BF5 of turning off the brake is performed is the stop position.

When it is determined that a deceleration and stop behavior is performed in the candidate area, the ITSECU 5 increases the number of stops in the candidate area by 1. In addition, the ITSECU 5 divides the number of stops in the candidate area by the number of passages (the total number of passages) to calculate a stop rate. Then, when the number of passages through the candidate area is equal to or greater than a predetermined value (for example, 5 or 10 or more) and the stop rate (corresponding to the frequency of stop) is equal to or greater than a threshold value (for example, 80% or 90% or more), the ITSECU 5 specifies the candidate area as the assistance area.

When the candidate area is specified as the assistance area, the ITSECU 5 updates assistance area registration information about the assistance area. The assistance area registration information is deceleration prediction information about the assistance area and is also deceleration start position information, brake start position information, and stop position information about each assistance area (the assistance area registration information may also include the stop rate (the frequency of stop)). The deceleration start position is an ordinary deceleration start position when the vehicle (driver) is stopped for the deceleration target, the brake start position is an ordinary brake start position when the driver of the vehicle starts a brake operation, and the stop position is the ordinary stop position of the vehicle (driver). Whenever the vehicle travels along the same traveling route, the deceleration start position information, the brake start position information, and the stop position information about the same assistance area are obtained and a distribution is generated for each position. For example, an average position in the distribution for each position is registered as each position information item.

As the assistance area registration information, for each assistance area, there are information including all traveling patterns in the assistance area and each information item about four traveling patterns. Therefore, whenever the deceleration behavior learning is performed for a given area, the assistance area registration information about the entire area is updated and the assistance area registration information of the traveling pattern recognized by the learning process is updated. Then, the ITSECU 5 stores the updated assistance area registration information in the database 5b.

The ITSECU 5 sets (updates) reliability to the four traveling patterns. When the reliability of each traveling pattern is changed, the ITSECU 5 stores the changed reliability of each traveling pattern in the database 5b.

In the setting of the reliability, first, the ITSECU 5 compares the positions of the deceleration start position distributions in the four traveling patterns, using the deceleration start position information of the approach behavior in each traveling pattern stored in the database 5b, and sets the reliability ranks such that a higher rank is given to the traveling pattern in which the deceleration start position distribution is closer to an area entrance point. As described above, since it has been found that the basic pattern starts the deceleration approach earliest, rank A is set to the basic pattern and reliability is set to the other three traveling patterns on the basis of the comparison result of the deceleration start position distributions. Therefore, in the first step, the basic pattern is set to rank A.

Then, the ITSECU 5 compares the position of the deceleration start position distribution in the traveling pattern of rank A with the position of the behavior-before-approach distribution in the traveling pattern of rank B, using the deceleration start position information of the approach behavior in the traveling pattern (the basic traveling pattern) of rank A and the driving operation position information of the behavior before approach in the traveling pattern of rank B which are stored in the database 5b. When the deceleration start position distribution in the traveling pattern of rank A is closer to the stop position than the behavior-before-approach distribution in the traveling pattern of rank B, the ITSECU 5 maintains the ranks of reliability corresponding to the comparison between the positions of the deceleration start position distributions. On the other hand, when the behavior-before-approach distribution in the traveling pattern of rank B is closer to the stop position than the deceleration start position distribution in the traveling pattern of rank A, the ITSECU 5 sets the ranks of reliability on the basis of the ratio of the frequency of execution of the traveling pattern to the frequency of execution of the basic pattern, using the number of stops in each traveling pattern stored in the database 5b (when the following conditions are satisfied, rank A and rank B are interchanged). Since the traveling pattern which is frequently executed in each area is the pattern of the operation which is frequently performed by the driver in the area, it is likely to be the pattern of the habitual driving operation of the driver.

When the fluttering accelerator pattern is rank B and the condition that the ratio of the frequency of execution of the fluttering accelerator pattern to the frequency of execution of the basic pattern (=the number of executions of the fluttering accelerator pattern/the number of executions of the basic pattern) is equal to or greater than 1.0 (the frequency of execution is equal to or greater than 1) is satisfied, the varying accelerator pattern is changed to rank A. Since the fluttering accelerator pattern is close to the habit of the driver, the condition that the ratio of the fluttering accelerator pattern is a low value of 1.0 is set. When the deceleration pattern caused by disturbance is rank B and the condition that the ratio of the frequency of execution of the deceleration pattern caused by disturbance to the frequency of execution of the basic pattern (=the number of executions of the deceleration pattern caused by the disturbance/the number of executions of the basic pattern) is equal to or greater than 2.0 (the frequency of execution is equal to or greater than 2) is satisfied, the deceleration pattern caused by the disturbance is changed to rank A. Since the deceleration traveling pattern caused by disturbance is affected by disturbance, the condition that the ratio is a large value of 2.0 is set. When the deceleration pattern caused by a fluttering accelerator and disturbance is rank B and the condition that the ratio of the frequency of execution of the deceleration pattern to the frequency of execution of the basic pattern (=the number of executions of the deceleration pattern caused by a fluttering accelerator and disturbance/the number of executions of the basic pattern) is equal to or greater than 3.0 (the frequency of execution is equal to or greater than 3) is satisfied, the deceleration pattern caused by a fluttering accelerator and disturbance is changed to rank A. Since the deceleration traveling pattern caused by a fluttering accelerator and disturbance is greatly affected by disturbance, the condition that the ratio is a large value of 3.0 is set.

When the position of the deceleration start position distribution or the behavior-before-approach distribution is compared, for example, the average position of the distribution is calculated and the position is compared with the average position or the comparison is performed using the position that is furthest away from the stop position in the distribution.

Next, the deceleration prediction will be described. In the deceleration prediction, when the vehicle enters the assistance area, the deceleration prediction information of the traveling pattern of rank A is output. In the deceleration prediction, the traveling pattern is recognized in the behavior-before-approach check section. When the recognized traveling pattern is not rank A, the deceleration prediction information of the recognized traveling pattern is output.

Specifically, when it is determined by the above-mentioned process that the vehicle enters the candidate area and the candidate area is specified as the assistance area, the ITSECU 5 outputs the deceleration prediction information of the traveling pattern of rank A in the assistance area which is stored in the database 5b to the HVECU 6. Whenever the current position information is received from the navigation system 3 after the vehicle enters the assistance area, the ITSECU 5 determines whether the vehicle reaches the deceleration start position in the traveling pattern of rank A.

When it is determined that the vehicle does not reach the deceleration start position in the traveling pattern of rank A (that is, the behavior-before-approach check section), the ITSECU 5 recognizes any one of the four traveling patterns, using the accelerator operation information and the brake operation information in the behavior-before-approach check section which are stored in the database 5b. Here, the traveling pattern is recognized by determining whether there is the behavior before approach described in the deceleration behavior learning and determining which of the three traveling patterns includes the behavior before approach when there is the behavior before approach. Then, when the recognized traveling pattern is not the traveling pattern of rank A, the ITSECU 5 outputs the deceleration prediction information of the recognized traveling area in the assistance area which is stored in the database 5b to the HVECU 6.

In the example shown in FIG. 5, rank A is the basic pattern and the deceleration prediction information Y1 (a deceleration start position AF1, a brake start position BN1, and a stop position BF1) of the basic pattern is output at the time the vehicle enters the assistance area. While the vehicle is traveling in the behavior-before-approach check section, the fluttering accelerator operation is recognized from the pedal operation information and the deceleration prediction information Y2 (a deceleration start position AF2, a brake start position BN2, and a stop position BF2) of the fluttering accelerator pattern is output. The positions AF2, BN2, and BF2 in the accelerator deceleration prediction information Y2 are closer to the temporary stop line L than the positions AF1, BN1, and BF1 in the deceleration prediction information Y1 of the basic pattern. Therefore, it is possible to perform accurate eco assistance suitable for the current traveling pattern of the driver, using the positions AF2, BN2, and BF2.

The HVECU 6 is an electronic control unit including, for example, a CPU, a ROM, and a RAM and controls the engine and the motor (inverter) which are a driving source of the hybrid vehicle and the brake which is a braking source. Among the functions of the HVECU 6, only an eco assistance function using the deceleration prediction information corresponding to the traveling pattern from the ITSECU 5 will be described. Examples of the eco assistance when the hybrid vehicle is decelerated and stopped includes turning off the accelerator early to reduce fuel consumption, changing the amount of regenerative braking to increase the collected power, and stopping the engine to reduce fuel consumption and power consumption.

The HVECU 6 determines whether the vehicle enters the assistance area whenever the current position information is received from the navigation system 3 while the vehicle is traveling. When it is determined that the vehicle enters the assistance area, the HVECU 6 provides information to urge the driver to turn off the accelerator earlier than usual to the driver at a position before the deceleration start position, on the basis of the deceleration start position in the deceleration prediction information. In the provision of the information, for example, a message 'when turning off the accelerator earlier than usual, you can reduce fuel consumption' is displayed on the screen or it is output as a sound. When the driver turns off the accelerator in the assistance area, the HVECU 6 controls the motor (inverter) or the brake such that the amount of regenerative braking increases (for example, deceleration increases), on the basis of the stop position in the deceleration prediction information. The above-mentioned eco assistance using the deceleration prediction information is an illustrative example, but the eco assistance may be performed by other methods using the deceleration prediction information.

In the case of an automatic driving vehicle or a vehicle with an ACC function, the vehicle controls acceleration and deceleration. Therefore, the vehicle may control the engine, the motor, and the brake on the basis of the usual deceleration and stop behavior of the vehicle (driver) at the usual deceleration and stop position of the vehicle (driver) to turn off the accelerator early on the basis of the deceleration prediction information, increase the amount of regenerative braking, and stop the engine.

Figure 7:
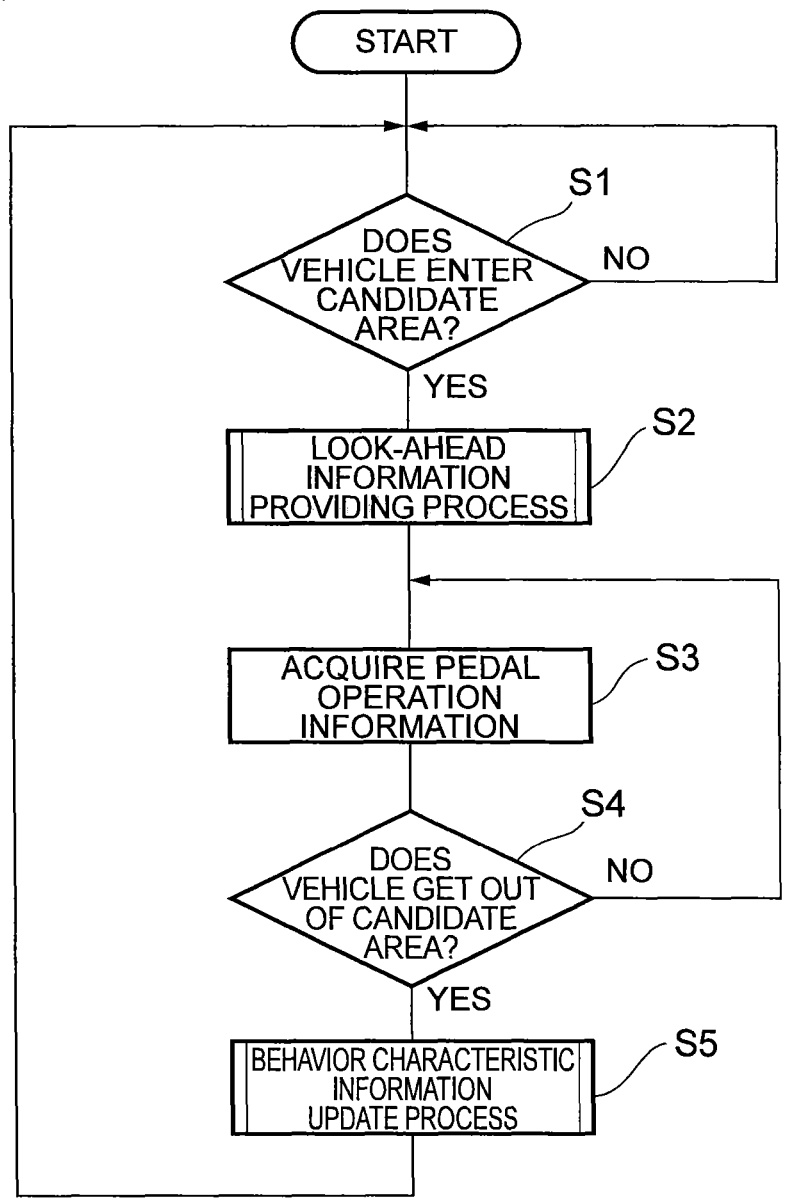
FIG. 7 is a flowchart illustrating the flow of a main process of an ITSECU according to this embodiment.
Figure 8:
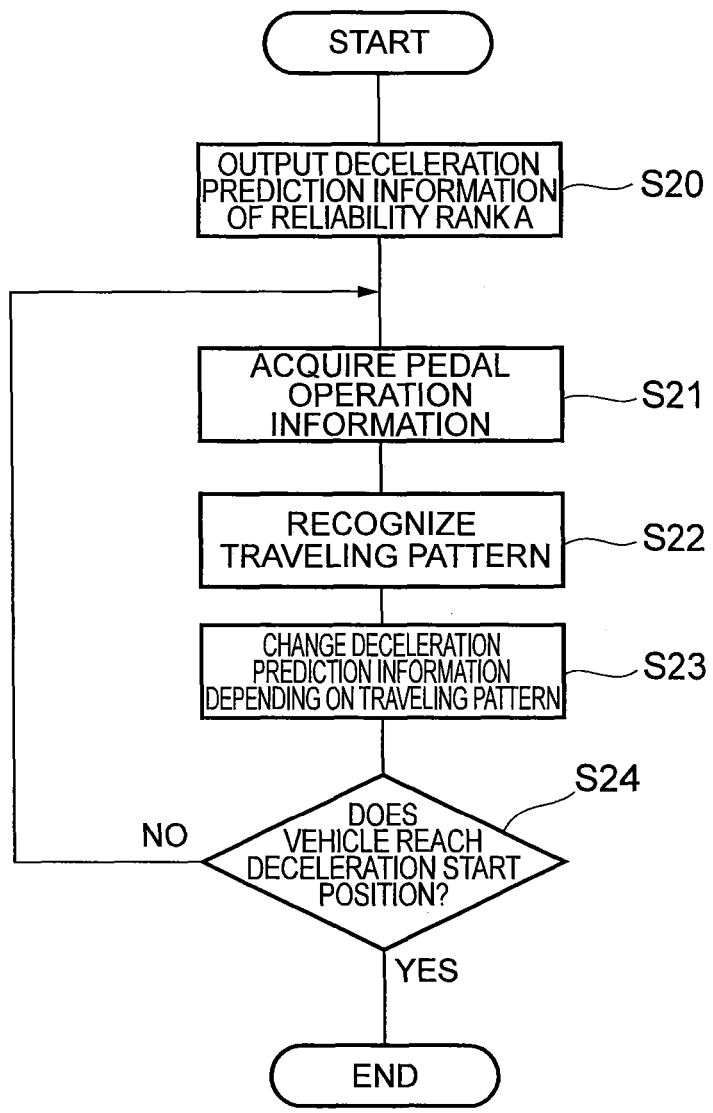
FIG. 8 is a flowchart illustrating the flow of a look-ahead information providing process of the ITSECU according to this embodiment.
Figure 9:
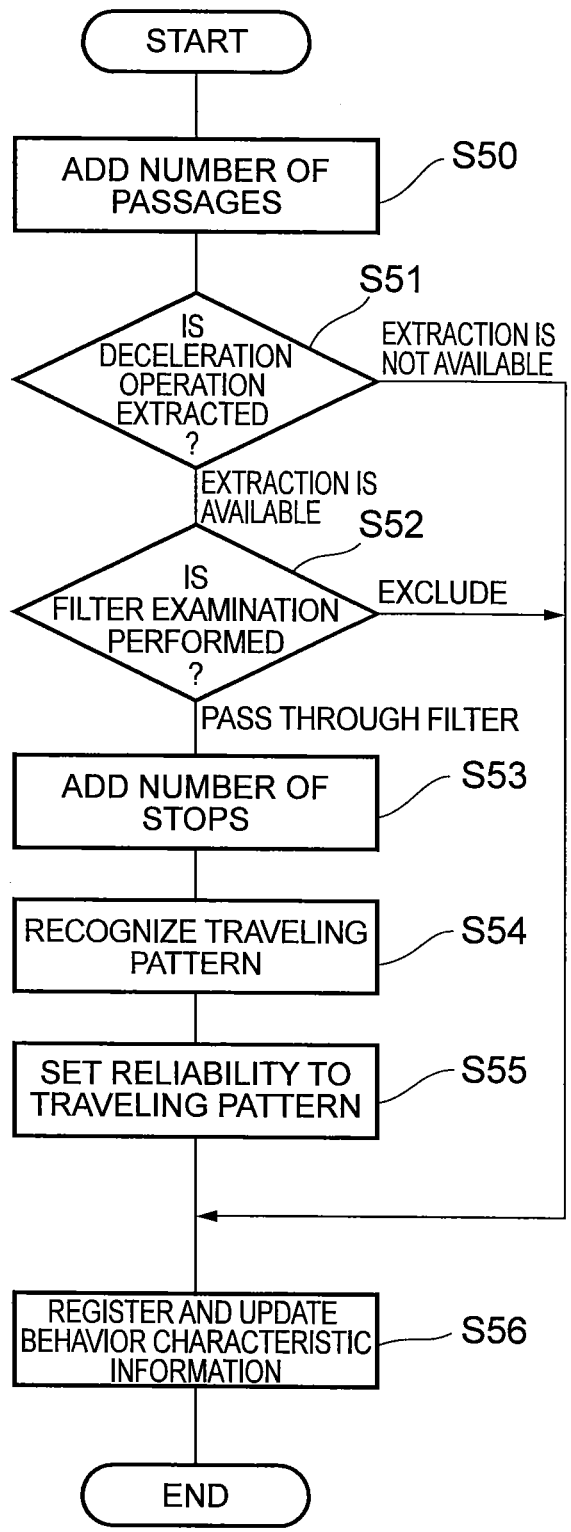
FIG. 9 is a flowchart illustrating the flow of a behavior characteristic information update process of the ITSECU according to this embodiment.

Next, the operation of the vehicle information processing system 1 will be described with reference to FIG. 1. In particular, the main process of the ITSECU 5 will be described with reference to the flowchart shown in FIG. 7, a look-ahead information providing process (corresponding to deceleration prediction) will be described with reference to the flowchart shown in FIG. 8, and a behavior characteristic information update process (corresponding to deceleration behavior learning) will be described with reference to the flowchart shown in FIG. 9. FIG. 7 is a flowchart illustrating the flow of the main process of the ITSECU according to this embodiment. FIG. 8 is a flowchart illustrating the flow of the look-ahead information providing process of the ITSECU according to this embodiment. FIG. 9 is a flowchart illustrating the flow of the behavior characteristic information update process of the ITSECU according to this embodiment. When an ignition switch is turned on, for example, the ITSECU 5 starts each process.

Whenever the vehicle enters the communication area of the infrastructure, the road-to-vehicle communication device 2 receives, for example, information about the alignment of the road to the intersection, which is a service target, information about the intersection, and signal cycle information from the infrastructure and transmits necessary information among the received information items to the ITSECU 5. Whenever the current position is detected on the basis of, for example, GPS signals, the navigation system 3 transmits the current position information and map information around the current position to the ITSECU 5. The ITSECU 5 acquires, for example, pedal operation information and vehicle speed information from the CAN 4.

Whenever the current position information is received while the vehicle is traveling, the ITSECU 5 determines whether the vehicle passes through the position where the vehicle is predicted to stop (the section in which the deceleration operation is predicted to be frequently performed) on the basis of the map information. When the vehicle passes through the position where the vehicle is predicted to stop, the ITSECU 5 sets the candidate area on the basis of information about the position. Alternatively, while the vehicle is traveling, the ITSECU 5 stores the pedal operation information and the current position information in the database 5a so as to be associated with each other at a predetermined time interval or a predetermined distance interval. Then, the ITSECU 5 extracts the deceleration operation from the pedal operation information stored in the database 5a, determines the section in which the deceleration operation is frequently performed and sets the section as the candidate area.

When the candidate area is set, the ITSECU 5 determines whether the vehicle enters the candidate area on the basis of the current position information whenever the current position information is received while the vehicle is traveling (S1). When it is determined in S1 that the vehicle does not enter the candidate area, the ITSECU 5 waits until the next current position information is received and determines whether the vehicle enters the candidate area again (S1). When it is determined in S1 that the vehicle enters the candidate area and the candidate area is specified as the assistance area, the ITSECU 5 performs the look-ahead information providing process (S2).

In the look-ahead information providing process, when the vehicle enters the assistance area, the ITSECU 5 outputs the deceleration prediction information of the traveling pattern of reliability rank A to the HVECU 6, using the assistance area registration information of the assistance area stored in the database 5b (S20).

Whenever the current position information is received (or at a predetermined time interval or whenever the turning-on/off of the pedal is detected), the ITSECU 5 acquires the pedal operation information and the vehicle behavior information (for example, vehicle speed information) from the CAN 4 and stores the pedal operation information, the current position information, and the vehicle behavior information as data for the candidate area which the vehicle is entering in the database 5b so as to be associated with each other (S21). Then, the ITSECU 5 sorts the behaviors before approach on the basis of the information of the behavior-before-approach check section stored in the database 5b and recognizes the current traveling pattern of the driver in the assistance area which the vehicle is entering (S22). Then, when the recognized traveling pattern is different from the traveling pattern of reliability rank A, the ITSECU 5 outputs the deceleration prediction information of the recognized traveling pattern to the HVECU 6, using the assistance area registration information of the assistance area which is stored in the database 5b (S23).

The ITSECU 5 determines whether the vehicle reaches the deceleration start position in the traveling pattern of reliability rank A on the basis of the current position information (S24). When it is determined in S24 that the vehicle does not reach the deceleration start position (in the behavior-before-approach check section), the ITSECU 5 returns to S21. When it is determined in S24 that the vehicle reaches the deceleration start position (out of the behavior-before-approach check section), the ITSECU 5 ends the look-ahead information providing process.

After the look-ahead information providing process ends, the ITSECU 5 acquires, for example, pedal operation information using the same process as that in S21 and stores the pedal operation information in the database 5b (S3). Then, the ITSECU 5 determines whether the vehicle gets out of the candidate area on the basis of the current position information (S4). When it is determined in S4 that the vehicle does not get out of the candidate area, the ITSECU 5 returns to S3. When it is determined in S4 that the vehicle gets out of the candidate area, the ITSECU 5 proceeds to the behavior characteristic information update process (S5).

After proceeding to the behavior characteristic information update process, the ITSECU 5 increases the number of passages through the candidate area by 1 (S50). The ITSECU 5 sorts the deceleration operation and the acceleration operation on the basis of the pedal operation information for the candidate area which is currently stored in the database 5b and extracts the deceleration operation (S51). When the deceleration operation is extracted in S51, the ITSECU 5 determines the corresponding deceleration pattern from the deceleration patterns as a first filter and determines whether the deceleration operation is the approach behavior to the deceleration target or the deceleration behavior before and after approach (S52). The ITSECU 5 determines whether the vehicle is stopped by the deceleration operation of the approach behavior in the candidate area. When only the approach behavior among the deceleration operations in the candidate area is extracted, the ITSECU 5 determines whether there is a creep operation in the approach behavior as a second filter (S52). When the approach behavior does not include the creep operation, the ITSECU 5 specifies the deceleration start position from the position information when the accelerator is turned off, specifies the brake start position from the position information when the brake is turned on first after the accelerator is turned off, and specifies the stop position from the position information when the brake is finally turned off, on the basis of the deceleration operation in the approach behavior. When the approach behavior includes the creep operation, the ITSECU 5 specifies the deceleration start position and the brake start position using the same method as described above and specifies the stop position from the position information when the brake which starts to be operated during the creep operation is turned off first.

When it is determined that there is a deceleration and stop behavior (when the operation passes through the filter in the filter examination in S52), the ITSECU 5 adds the number of stops to the candidate area (the ITSECU 5 increases the number of stops by 1) (S53). In addition, the ITSECU 5 updates the stop rate from the number of stops for the candidate area and the number of passages through the candidate area.

The ITSECU 5 sorts the behaviors before approach on the basis of the information about the candidate area which is currently stored in the database 5 and recognizes the current traveling pattern of the driver (S54). When the traveling pattern is recognized in S22, the recognition result may be used.

The ITSECU 5 compares the positions of the deceleration start position distributions in the four traveling patterns on the basis of the deceleration start position information about the four traveling pattern which has been stored in the database 5b for the candidate area until now and sets the reliability rank to each traveling pattern such that a higher rank is given to the traveling pattern in which the deceleration start position distribution is closer to the area entrance point (S55). In addition, the ITSECU 5 compares the position of the deceleration start position distribution in the traveling pattern of rank A with the position of the behavior-before-approach distribution in the traveling pattern of rank B, on the basis of the deceleration start position information and execution frequency information about the traveling pattern of rank A and the operation position information of the behavior before approach and the execution frequency information for the traveling pattern of rank B which have been stored in the database 5b for the candidate area until now. If the behavior-before-approach distribution in the traveling pattern of rank B is closer to the stop position than the deceleration start position distribution in the traveling pattern of rank A, rank A and rank B are interchanged only when the above-mentioned conditions are satisfied on the basis of the ratio of the frequency of execution of the traveling pattern to the frequency of execution of the basic pattern (S55).

Then, when the number of passages through the candidate area is equal to or greater than a predetermined value and the stop rate is equal to or greater than a threshold value, the ITSECU 5 specifies the candidate area as the assistance area. When the candidate area is specified as the assistance area, the ITSECU 5 updates the assistance area registration information (which is deceleration prediction information and includes, for example, deceleration start position information, brake start position information, stop position information, and stop frequency information for each assistance area) of the entire assistance area, updates the assistance area registration information about the current traveling pattern, and stores the updated information in the database 5b (S56). When the reliability of each traveling pattern is updated by the above-mentioned process, the ITSECU 5 stores the updated reliability of each traveling pattern in the database 5b (S56). Then, the ITSECU 5 ends the behavior characteristic information update process and returns to S1.

When the deceleration prediction information is input from the ITSECU 5, the HVECU 6 performs, for example, an information providing process and a vehicle control process for eco assistance, on the basis of the usual deceleration start position, brake start position, and stop position of the vehicle (furthermore, the driver of the vehicle) in the current traveling pattern in the assistance area.

According to the vehicle information processing system 1 (particularly, the ITSECU 5), four traveling patterns for each assistance area and the deceleration assistance information of each traveling pattern are stored in the database 5b so as to be associated with each other. When the vehicle enters each assistance area, the traveling pattern is recognized and the deceleration assistance information corresponding to the recognized traveling pattern is output. Therefore, it is possible to assist the driver using high-accuracy deceleration prediction information corresponding to the traveling pattern (it is possible to improve the accuracy of prediction used for assistance) and thus perform assistance suitable for the driver with high accuracy. Since assistance suitable for the driver is performed according to the traveling pattern in the assistance area, the driver can receive assistance without feeling complicated or discomfort for the assistance. In addition, since deceleration assistance information corresponding to the traveling pattern is output, it is possible to perform eco assistance suitable for the traveling pattern of the driver.

According to the vehicle information processing system 1, four traveling patterns corresponding to the habit of the driving operation of the driver or the influence of disturbance are prepared and it is possible to simply and accurately recognize the traveling pattern among the four traveling patterns, on the basis of the driving operation information of the driver when the vehicle enters each area.

According to the vehicle information processing system 1, since reliability is set to each traveling pattern, it is possible to simply and accurately determine the deceleration assistance information to be output, on the basis of the reliability (particularly, rank A). In particular, according to the vehicle information processing system 1, the reliability is set to the four traveling patterns such that a higher rank is set to the traveling pattern in which the deceleration start position is closer to the area entrance position. Therefore, it is possible to accurately set reliability to each traveling pattern and output the deceleration assistance information of the traveling pattern which starts a deceleration approach earliest. In addition, according to the vehicle information processing system 1, for the traveling pattern of rank A and the traveling pattern of rank B, rank A and rank B can be interchanged on the basis of the ratio of the frequency of execution of the traveling pattern to the frequency of execution of the basic pattern. Therefore, it is possible to set reliability to each traveling pattern with high accuracy and output the deceleration assistance information of the traveling pattern which is frequency executed by the driver. Even in the traveling pattern in which there is a behavior before approach after the behavior-before-approach check section, when the frequency of execution of the traveling pattern is high, the traveling pattern can be set to rank A in advance. Therefore, it is possible to output the deceleration assistance information of the traveling pattern.

According to the vehicle information processing system 1, when a different traveling pattern is recognized in the behavior-before-approach check section while the deceleration prediction information of the traveling pattern of rank A is output at the time the vehicle enters the assistance area, the deceleration prediction information of the traveling pattern is output. Therefore, it is possible to output high-accuracy deceleration prediction information early and change the deceleration prediction information to deceleration prediction information with higher accuracy.

The embodiment of the invention has been described above. However, the invention is not limited to the above-described embodiment, but various modifications and changes of the invention can be made.

For example, in this embodiment, the vehicle includes the database and performs each learning process. However, a center which provides various services to the vehicle may include the database and the center may perform each learning process. In this case, it is possible to reduce the memory capacity or processing load of each vehicle. When the center includes the database, the center and the vehicle can perform wireless communication therebetween and the vehicle transmits each information item stored in the database to the center and receives, for example, assistance area registration information from the center. The database of the center stores data for all vehicles (drivers) which are assistance targets. In addition, the center may include the database and each vehicle may perform each learning process. In this case, it is possible to reduce the memory capacity of the vehicle.

In this embodiment, assistance is performed for deceleration and stop. However, the invention can also be applied to a case in which assistance is performed for start and acceleration. For the start and acceleration, candidate area learning or start and acceleration behavior learning can be performed by the same method as described above, using various start and acceleration patterns or traveling patterns. In addition, in this embodiment, the invention is applied to eco assistance. However, the invention can be applied to other assistances.

In this embodiment, hardware configuration for achieving the invention and an example of the process performed by the hardware configuration have been described. However, other hardware configurations or processes for achieving the invention may be used. For example, each learning process is not performed by the ITSECU, but it may be performed by a navigation ECU.

In this embodiment, the assistance area is specified from the candidate areas on the basis of the frequency of stop. However, other methods may be used to specify the assistance area.

In this embodiment, an example of the reliability setting method has been described. However, other methods may be used. In this embodiment, reliability is set to each traveling pattern and the deceleration prediction information to be output is determined on the basis of the reliability. However, the deceleration prediction information may be determined, without setting reliability to the traveling pattern.

In this embodiment, the behavior start position before stop is used as the deceleration start position and the traveling pattern is recognized on the basis of the section to the deceleration start position. However, the brake start position or the stop position may be used as the behavior start position before stop.

INDUSTRIAL APPLICABILITY

In the invention, when the vehicle enters the assistance area, the operation pattern of the driver is set and assistance information is determined on the basis of the operation pattern. Therefore, it is possible to assist the driver using high-accuracy assistance information corresponding to the operation pattern and thus perform assistance suitable for the driver with high accuracy.

REFERENCE SIGNS LIST

1: Vehicle Information Processing System
2: Road-to-Vehicle Communication Device
3: Navigation System
4 CAN
5: ITSECU
5a, 5b: Database
6 HVECU

The invention claimed is:

1. A vehicle information processing system for assisting a driver in a specified assistance area, comprising:
  a database that stores pedal operation pattern, which is a pattern of a turning off of an accelerator of the vehicle, and assistance information for assisting the driver corresponding to the pedal operation pattern so as to be associated with each other for each assistance area, the pedal operation pattern and the assistance information for a respective assistance area set based upon learned data specific to the driver and the respective assistance area;
a sensor that acquires a current position of the vehicle; and
a controller that:
acquires driving operation information of the driver when it is determined that the driver enters the assistance area based on information received from the sensor;
sets the pedal operation pattern in the assistance area on the basis of the driving operation information;
determines the assistance information for assisting the driver in the assistance area on the basis of the set pedal operation pattern in the assistance area, with reference to the database; and
assists the driver in accordance with the assistance information.

2. The vehicle information processing system according to claim 1, wherein
the pedal operation pattern in the assistance area is provided according to an operation factor, and
the controller sets the pedal operation pattern in the assistance area on the basis of the driving operation information of the driver from the time when the driver enters the assistance area to a behavior-before-stop start position.

3. The vehicle information processing system according to claim 1, wherein, when the set pedal operation pattern in the assistance area is changed, the controller changes the assistance information depending on the changed operation pattern.

4. The vehicle information processing system according to claim 1, wherein
reliability is set to each pedal operation pattern on the basis of a behavior-before-stop start position from an assistance area entrance position, and
the controller determines the assistance information on the basis of the reliability of each pedal operation pattern.

5. The vehicle information processing system according to claim 4, wherein higher reliability is set to the pedal operation pattern in which the behavior-before-stop start position in the assistance area is closer to the assistance area entrance position.

6. The vehicle information processing system according to claim 4, wherein the reliability is set on the basis of a number of times the driver performs the same pedal operation pattern in the assistance area.

7. The vehicle information processing system according to claim 6, wherein the reliability set to the pedal operation pattern with high frequency of execution is higher than the reliability set to the operation pattern with low frequency of execution.

8. The vehicle information processing system according to claim 4, wherein the reliability is set to each pedal operation pattern stored in the database.

9. The vehicle information processing system according to claim 1, wherein
the driving operation information of the driver and vehicle position information are stored so as to be associated with each other,
stopping of the vehicle is determined on the basis of the stored information, and
the assistance area is specified on the basis of a frequency of stop in the same area.

10. The vehicle information processing system according to claim 1, wherein the assistance information includes at least one of turning off the accelerator early, changing an amount of regenerative braking, and stopping an engine of the vehicle.

11. The vehicle information processing system according to claim 1, wherein the pedal operation pattern is a pattern including a plurality of instances of the turning off of the accelerator of the vehicle.

* * * * *